(12) United States Patent
Ohno

(10) Patent No.: US 7,349,329 B2
(45) Date of Patent: Mar. 25, 2008

(54) NETWORK SYSTEM, DATA TRANSMITTER-RECEIVER AND FAILURE LOCATION/COMPENSATION METHOD

(75) Inventor: Yasuaki Ohno, Wako (JP)

(73) Assignee: Honda Motor Co., Ltd., Minato-Ku (JP)

( * ) Notice: Subject to any disclaimer, the term of this patent is extended or adjusted under 35 U.S.C. 154(b) by 845 days.

(21) Appl. No.: 10/703,918

(22) Filed: Nov. 6, 2003

(65) Prior Publication Data

US 2004/0153861 A1 Aug. 5, 2004

(30) Foreign Application Priority Data

Nov. 7, 2002 (JP) .............................. 2002-323480

(51) Int. Cl.
*H04J 1/16* (2006.01)

(52) U.S. Cl. ...................................... 370/222; 370/225

(58) Field of Classification Search ..................... None
See application file for complete search history.

(56) References Cited

U.S. PATENT DOCUMENTS

| 4,683,563 | A | * | 7/1987 | Rouse et al. ................. 370/224 |
| 4,763,315 | A | * | 8/1988 | Nakayashiki et al. ....... 370/224 |
| 4,774,706 | A | * | 9/1988 | Adams ......................... 370/465 |
| 5,245,605 | A | * | 9/1993 | Ofek ............................ 370/447 |
| 5,361,250 | A | * | 11/1994 | Nguyen et al. .............. 370/222 |
| 5,517,656 | A | * | 5/1996 | Shi .............................. 712/29 |
| 5,602,827 | A | * | 2/1997 | Lindeborg et al. .......... 370/223 |
| 5,991,831 | A | * | 11/1999 | Lee et al. ..................... 710/33 |
| 6,047,002 | A | * | 4/2000 | Hartmann et al. .......... 370/466 |
| 6,266,797 | B1 | * | 7/2001 | Godfrey et al. ................ 716/1 |
| 2006/0276913 | A1 | * | 12/2006 | Pearce et al. .................. 700/20 |

FOREIGN PATENT DOCUMENTS

| JP | 60-254850 | 12/1985 |
| JP | 5-336134 | 12/1993 |
| JP | 2002-094535 | 3/2002 |

\* cited by examiner

*Primary Examiner*—Andrew C. Lee
(74) *Attorney, Agent, or Firm*—Hamre, Schumann, Mueller & Larson, P.C.

(57) ABSTRACT

A data transmitter-receiver 30 arranged on a ring network to form a node includes a normal-direction data transmit/receive unit 19, a reverse-direction data transmit/receive unit 20, a buffer control unit 13, a controller 14, and connectors 11, 12. The normal-direction data transmit/receive unit 19 includes a received signal demodulator 7, an input buffer 3, an output buffer 1, an intermediate buffer 2, a sending signal modulator 8, and data buses 15, 16. The reverse-direction data transmit/receive unit 20 has the same construction as the normal-direction data transmit/receive unit 19. Two-way data transmission and verification of transmitted data in each node serves to locate a failure, and the buffer control unit 13 selectively activates or deactivates the buffers to compensate the failure. Thus, adequate detection, accurate location, proper compensation of a failure can be achieved in a relatively low-cost network system so that the communication functionality of the whole system can be maintained.

14 Claims, 6 Drawing Sheets

FIG.5

| DATA TRANSMISSION DIRECTION | NORMAL DIRECTION | | | | REVERSE DIRECTION | | | |
|---|---|---|---|---|---|---|---|---|
| LOCATION OF FAILURE \ NODE | A | B | C | D | A | B | C | D |
| NO FAILURE | A, B, C, D | A, B, C, D | A, B, C, D | A, B, C, D | A, B, C, D | A, B, C, D | A, B, C, D | A, B, C, D |
| FAILURE BETWEEN NODES A-B | B, C, D | — | B | B, C | — | A, C, D | A, D | A |
| FAILURE BETWEEN NODES B-C | C, D | A, C, D | — | C | B | — | A, B, D | A, B |
| FAILURE BETWEEN NODES C-D | D | A, D | A, B | — | B, C | C | — | A, B, C |
| FAILURE BETWEEN NODES D-A | — | A | A, B | A, B, C | B, C, D | C, D | D | — |
| FAILURE(1) IN NODE A | — | B, C, D | B, C, D | B, C, D | — | B, C, D | B, C, D | B, C, D |
| FAILURE(1) IN NODE B | A, C, D | — | A, C, D | A, C, D | A, C, D | — | A, C, D | A, C, D |
| FAILURE(1) IN NODE C | A, B, D | A, B, D | — | A, B, D | A, B, D | A, B, D | — | A, B, D |
| FAILURE(1) IN NODE D | A, B, C | A, B, C | A, B, C | — | A, B, C | A, B, C | A, B, C | — |
| FAILURE(2) IN NODE A | — | — | — | B, C | — | C, D | D | — |
| FAILURE(2) IN NODE B | C, D | A, D | — | C | B | — | A, D | A |
| FAILURE(2) IN NODE C | D | — | — | — | — | — | — | A, B |
| FAILURE(2) IN NODE D | — | A | A, B | — | B, C | C | — | — |

NETWORK SYSTEM, DATA TRANSMITTER-RECEIVER AND FAILURE LOCATION/COMPENSATION METHOD

BACKGROUND OF THE INVENTION

This invention relates to a network system, data transmitter-receiver (transceiver), and failure location/compensation method in such a small-scale communications system required to be robust and reliable for safety purposes as is provided in an automobile.

In general, a communications network consists of devices (stations or nodes) and transmission lines, and is physically or logically arranged in a topology selected typically from dedicated line, bus, star, ring and mesh. The dedicated line provides a one-to-one connectivity between two specific devices via a private line. The bus topology consists of a single wire or cable and a plurality of stations connected thereto. The ring topology has a medium formed in a closed loop or ring to which a plurality of stations are connected. The mesh topology is a complex of other topologies, in which each node typically has at least two links to other nodes. In a network for establishing connections among a limited number of specific devices such as a communications system for devices installed in an automobile, not only the dedicated line and the star topology, but also the bus topology for use in a CAN (control area network) communication or PGM tester, are employed as well as any hybrid topologies resulting from combination of the above basic topologies (see JP 2002-94535 A).

However, these conventional topologies intrinsically involve difficulty in identifying and locating a failure, such that one can hardly determine where the failure occurs, in a device or on a transmission line. Therefore, in a routine operation for dealing with such a failure, first, the device in trouble, if located, is stopped, and then any problem, if it turns out to be still left unresolved, is treated as a breakdown of the communications system as a whole, in most instances. For example, in a ring topology as in common use, if a transmission line that connects two nodes is found faulty, communication is cut off at the faulty spot. A special system for maintaining the communication may sometimes be provided, but it is generally difficult to identify the communications line under the faulty condition. In some network configurations such as in a star topology or in a bus topology, where each node is independent from one another, when a failure occurs on a transmission line that provides connectivity between two nodes, the nodes are forced to be isolated from the system so that the communication throughout the whole system is securely prevented from failing. However, in a case where the isolated node holds important information for the communications system, the whole system would suffer too much to maintain the communication functionality thereof. Under these circumstances, it is conceivable that a hybrid topology with redundancy could be adopted in order to improve the robustness and reliability of the network, but the transmission lines only made physically redundant would increase the difficulty of detecting a failure at a single spot, thus concealing the failure that should be addressed proactively. In addition, in a case where each node including data transmitter-receiver is provided with redundancy, the whole communications system would disadvantageously become so large, and increase tasks of developing software and hardware therefor, thereby causing costs to add up.

Therefore, the present invention is made to eliminate the above disadvantages and it is one exemplified object to provide a means for maintaining communication functionality of the whole system by locating a failure on a transmission line and compensating for the loss due to the failure.

SUMMARY OF THE INVENTION

In one exemplary aspect of the present invention, there is provided a network system including a plurality of nodes arranged on a ring network, and a nonredundant transmission line formed in a closed loop for connecting every pair of adjacent nodes. In this network system, data is transmittable bidirectionally between the nodes through the nonredundant transmission line. Among operation modes of the nodes is a data communication verification mode, in which each node transmits packets of data at a series of definite times in normal and reverse directions alternately and sees if each node receives every packet of data from the nodes. This network system can provide information on the communication status of the ring network at the definite times. In the above data communication verification mode, the status of the network can be monitored. In other words, a time-triggered architecture (TTA) can be achieved according to this aspect of the present invention. Moreover, since a bilateral (two-way) ring network can be constructed with a single (nonredundant) transmission line, the costs of constructing the network system can be saved in contrast to an equivalent system with a conventional dual-ring topology which would require a duplicate transmission line.

The above operation modes of the nodes may further include a failed-part location mode in which a failed part is located based upon a direction of transmission and a sender node of each packet of data received in the data communication verification mode. Hereupon, the direction of transmission is a direction from which direction the packet is transmitted, normal or reverse. The sender node is an identifier of the node from which the data is originated and transmitted. The network system in this arrangement can locate a failed part on the ring network each time when a failure is detected by means of the above data communication verification mode. This feature of locating the failure makes it possible to compensate for the failure in the next stage, and to notify a user of the failed part (location) to recommend the user to repair or replace the failed part. In this system, it is each node that detects a failure on the ring network and locates a failed part. Therefore, a hub used in a star topology, or a broadcasting device used in a bus topology, or any other dedicated device for detecting a possible failure on the network is not required, and thus a simple, inexpensive and easy-constructible network system can be provided.

The above operation modes of the nodes may further include a failed-part isolation mode and a two-way transmission mode. In the failed-part isolation mode, two nodes adjacent to the failed part located in the failed-part location mode isolate the failed part from the ring network. In the two-way transmission mode, every packet of data is transmittable in the normal and reverse directions in nodes other than those adjacent to the failed part. The network system in this arrangement can isolate a failed part on the ring network, and can thereby maintain communication functionality of the ring network. This feature is advantageous in view of robustness and reliability of the network, particularly, in comparison with a conventional network system in the ring topology which may have a similar nonredundant transmission line but carries out one-way data communications, and thus has no other choice to treat one simple failure in one transmission segment on the network as a breakdown in the whole network system.

In another exemplified aspect of the present invention, there is provided a data transmitter-receiver arranged on a ring network to form a node connected with a nonredundant transmission line formed in a closed loop. This data transmitter-receiver includes a normal-direction data transmit/receive unit, a reverse-direction data transmit/receive unit, a buffer control unit, a controller, and connectors. The normal-direction data transmit/receive unit serves to transmit and receive data transmitted in a normal direction on the ring network, and the reverse-direction data transmit/receive unit serves to transmit and receive data transmitted in a reverse direction on the ring network. Each of the normal-direction and reverse-direction data transmit/receive units includes an input buffer for receiving data from the transmission line, an output buffer for outputting data to the transmission line, and an intermediate buffer provided between the input buffer and the output buffer. The buffer control unit serves to selectively activate and deactivate the input buffers, intermediate buffers and output buffers of the normal-direction and reverse-direction data transmit/receive units. The controller is adapted to exercise control over operation of the data transmitter-receiver. The connectors connect the normal-direction data transmit/receive unit and the reverse-direction data transmit/receive unit respectively with the transmission line. In this arrangement, data paths in the data transmitter-receiver can be controlled adequately by the buffer control unit. It is understood that more than one buffer may be provided as the input buffer, output buffer, and intermediate buffer, respectively in each of the normal-direction and reverse-direction data transmit/receive units.

In the above data transmitter-receiver, the buffer control unit may be configurable to switch a direction of data transmission on the ring network by selectively activating and/or deactivating the input buffers, output buffers and intermediate buffers under control of the controller. This configuration allows the data transmitter-receiver to switch the direction of transmission of data between a normal direction and a reverse direction, and to carry out two-way data communications on the ring network in a normal or reverse direction as appropriate. For example, the buffer control unit operates to switch the direction of data transmission so as to transmit packets of data in the normal and reverse directions alternately in the above data communication verification mode.

Further, the buffer control unit may be configurable to disable data transmission to a specific transmission line segment directly connected with the data transmitter-receiver by selectively activating and/or deactivating the input buffers, output buffers and intermediate buffers under control of the controller, for example, when at least one of the above transmission line segment and a node directly connected with the transmission line segment becomes unable to transmit data. This configuration makes it possible to isolate from the ring network the specific portion of the network (one transmission line segment, or one node+two transmission line segments adjacent thereto) that has been found unable to transmit data. This allows the network system to function in its entirety except for the failed part, as if the failed part never existed. Since each node recognizes the current situation that the failed part has been isolated from the network system, a user can remove the failed part for repair or replacement, while the communication functionality of the whole network system is maintained.

Moreover, the buffer control unit may be configurable to transmit every packet of data in the normal and reverse directions under control of the controller, particularly when a failed part is detected on the ring network in a location other than nodes adjacent to the data transmitter-receiver and a transmission line segment directly connecting the data transmitter-receiver with the adjacent nodes. This configuration allows the data transmitter-receiver to carry out the two-way data communication even if a failure is found in a specific location on the ring network. To be more specific, the data transmitter-receiver in operation can forward (transfer) data from one of the two transmission line segments directly connected therewith to the opposite transmission line segment, and can also transmit its own data (output from itself) via the transmission line segments in both directions. Accordingly, data communication between nodes is enabled, and the communication functionality of the whole system can be maintained.

In yet another exemplified aspect of the present invention, there is provided a method of locating a failure on a ring network including a plurality of nodes and a nonredundant transmission line for connecting every pair of adjacent nodes. The method comprises the steps of: allowing every node on the ring network to transmit packets of data for verification of communication at a series of definite times in normal and reverse directions alternately; verifying whether each node receives all the packets of data transmitted by the nodes each at the definite times; and locating a failed part on the ring network based upon a direction of transmission and a sender node of each packet of data of which receipt is verified for each receiving node. Hereupon, the direction of transmission is a direction from which the packet is transmitted, normal or reverse. The sender node is an identifier of the node from which the data is originated and transmitted. Additionally, the above method may further include the step of generating a notice of the failed part located on the ring network to be transmitted to a user. According to this method, a failure on the ring network can be located, so that the failure may be compensated for as will be described below, and a user may be notified of the failed part (location) and recommended to repair or replace the failed part.

In yet another exemplified aspect of the present invention, there is provided a method of compensating for a failure on a ring network including a plurality of nodes and a nonredundant transmission line for connecting every pair of adjacent nodes. This method comprises the steps of: allowing two nodes adjacent to a failed part located on the ring network to isolate the failed part from the ring network; and allowing nodes other than those adjacent to the failed part to transmit every packet of data in normal and reverse directions. According to this method, nodes adjacent to the failed part can be isolated from the ring network, while nodes other than those adjacent to the failed part can be operated in a manner that permits the two-way data communication as described above. Therefore, the communication functionality of the whole system can be maintained even when a failure is detected.

The above methods may be implemented as a computer program that causes a computer to execute the process steps as recited above. The computer program can be stored in a computer-readable media and carried to any place in which it is to be installed, or distributed or transferred online via communications network.

Other objects and further features of the present invention will become readily apparent from the following description of preferred embodiments with reference to accompanying drawings.

BRIEF DESCRIPTION OF THE DRAWINGS

FIG. 5 is a table for locating a failure from information on a sender node and transmission direction of data, and receiving nodes of the data according to the present embodiment.

DETAILED DESCRIPTION OF THE PREFERRED EMBODIMENTS

A detailed description of exemplified embodiments of the present invention will be given with reference to the drawings.

<Structure and Operation of Network System in Ring Topology>

Referring first to FIGS. 4A through 4D, the structure and operation of a network system in a ring topology according to an exemplary embodiment of the present invention will be described. The network system according to the present embodiment includes four nodes A-D arranged on a ring network, and a single (nonredundant) transmission line formed in a closed loop. The transmission line consists of transmission line segments each connecting adjacent nodes. A direction of transmission of data in each transmission line segment is indicated by an arrowhead thereof.

Figure 4A:
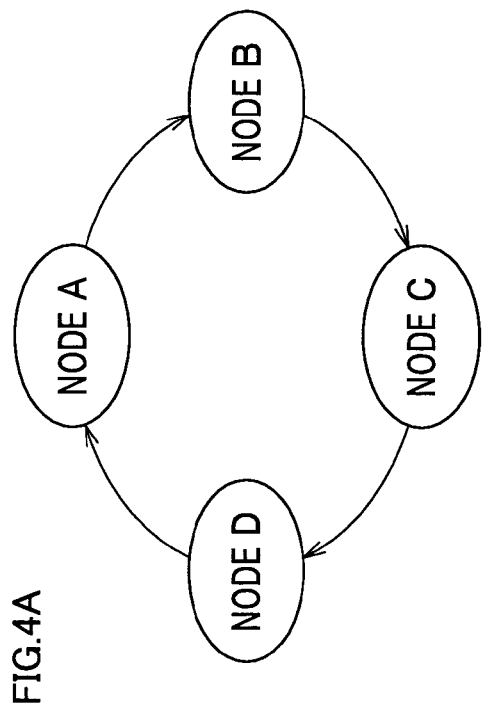
FIGS. 4A through 4D are schematic diagrams of an exemplary network in a ring topology according to the present embodiment.
Figure 4B:
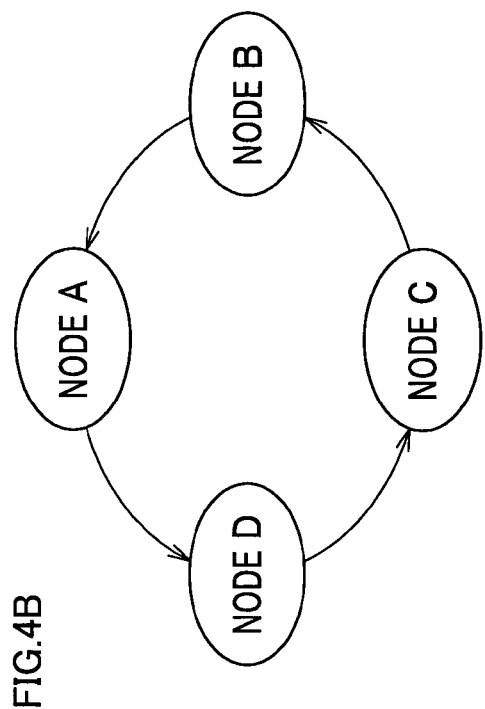

FIGS. 4A and 4B show a basic operation of each node on the ring network in a data communication verification mode. As shown in FIG. 4A, when a packet of the data for verification of communication (hereinafter referred to simply as "data packet" as appropriate) is transmitted in a normal direction (clockwise in FIG. 4A), the data packet output from Node A is transmitted through Nodes B, C and D in this sequence, and comes full circle along the ring, returning to Node A, at which the transmission is completed. As shown in FIG. 4B, when data packet is transmitted in a reverse direction (counterclockwise in FIG. 4B), the data packet output from Node A is transmitted through Nodes D, C and B in this sequence, and comes full circle along the ring, returning to Node A, at which the transmission is completed. In this way, all the nodes including Node A transmit data packets at a series of definite times in normal and reverse directions alternately and verify receipt of each data packet in order to verify whether all the nodes and all the transmission line segments are operating properly. The definite times refer to predetermined times at which each node transmits a data packet and verifies receipt thereof for each direction of transmission. For that purpose, a specific time and direction of transmission/receipt of data packets are assigned to each node in advance. The data packet output from each node for verification of communication may be transmitted in any format as long as the data packet contains information indicating that the data packet is intended for verification of communication and information identifying a sender node (the node from which the data packet is introduced into and transmitted on the network).

Figure 4C:
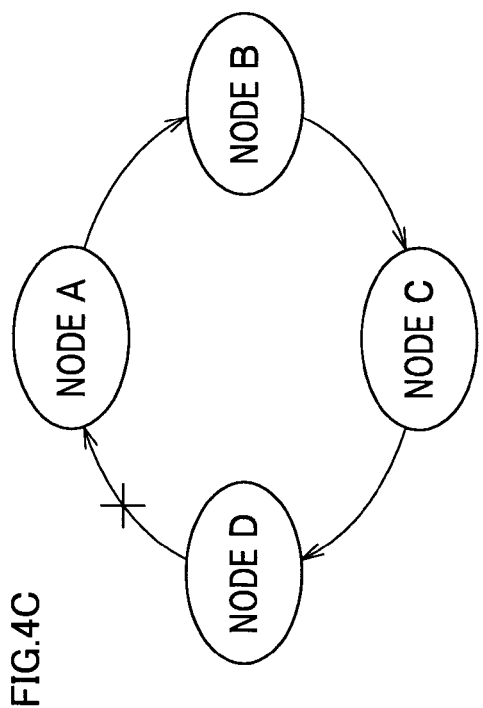

Next, operations in the nodes for locating a failed part on the ring network will be described with reference to FIG. 4C. Assuming that a transmission line segment between Node A and Node D fails as shown in FIG. 4C, a data packet transmitted from Node A in the normal direction reaches Nodes B, C and D, but will never return to Node A. Similarly, data packets transmitted from Nodes B, C and D in the normal direction will never reach Node A. On the other hand, data packets transmitted from Nodes B, C and D in the reverse direction are received by Node A, but will never return to the corresponding sender nodes because the transmission line segment between Node A and Node D fails. Therefore, Node A determines that the transmission line segment between itself (Node A) and Node D has failed, from the facts that data packets output from all Nodes including itself and transmitted in the normal direction have not been received through Node D, and that among data packets transmitted in the reverse direction, those output from all Nodes other than itself have been received but the only data packet output from itself (Node A) toward Node D has not been received. This is the operation of Node A in the failed-part location mode. In a like manner, Node D can also determine that the transmission line segment between Node A and itself (Node D) has failed. At this stage, Nodes A and/or D may be adapted to notify a user that the transmission line segment between Node A and Node D has failed.

In the same instance, Node B determines that the transmission line segment between Node A and Node D has failed, from the facts that among data packets transmitted in the normal direction, those output from all Nodes except for Node A have not been received, and that among data packets transmitted in the reverse direction, those output from all Nodes except for Nodes C and D have not been received. This is the operation of Node B in the failed-part location mode. In a like manner, Node C can also determine that the transmission line segment between Node A and Node D has failed. Accordingly, Nodes B and/or C may be adapted to notify a user that the transmission line segment between Node A and Node D has failed.

Figure 4D:
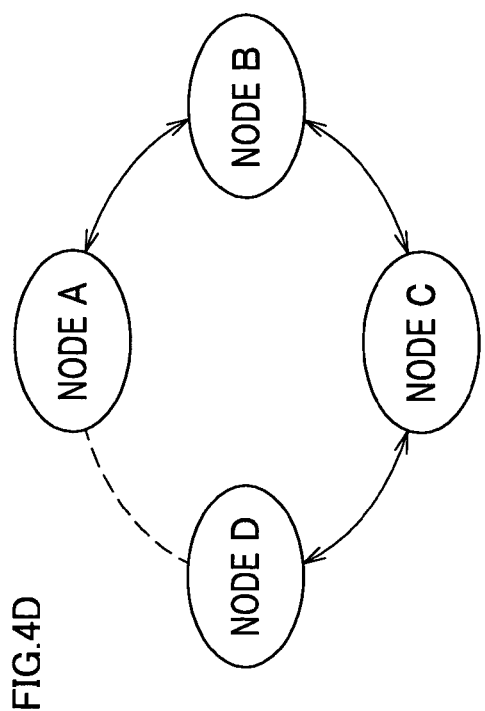

Next, operations in the nodes for compensating for a failure on the ring network will be described with reference to FIG. 4D. Node A and Node D that are directly connected with the failed transmission line segment is configured to isolate the failed transmission line segment and to entirely stop transmission and reception of data packets to and from the failed transmission line segment (failed-part isolation mode). As a result, Node A and Node D in the failed-part isolation mode are each configured to transmit and receive data packets to and from the only one of the two transmission line segments directly connected therewith, the one being opposite the failed transmission line segment. Node B and Node C that are not directly connected with the failed transmission line segment is turned into a two-way transmission mode in which data packets are transmitted bidirectionally, i.e., in the normal and reverse directions, because two-way data transmission needs to be enabled in order to maintain communications functionality of the whole system. To be more specific, in the two-way transmission mode, when each node has received data packets from one transmission line segment, the node forwards (transfers) the same data packets to the opposite transmission line segment, while if each node transmits its original data packets, the node transmits the same data packets to the both transmission line segments, i.e., in the normal and reverse directions. Thus, as shown in FIG. 4D, even when the transmission line segment between Node A and Node D is isolated, node-to-node communications functionality can be maintained utilizing the other transmission line segments.

In FIG. 5 is shown a relationship between failed parts and sender nodes of data packets that can be detected by each node. "Failure between Nodes" denotes a failure which takes place in a transmission line segment between the pertinent nodes. "Node Failure (1)" denotes a failure that prevents the pertinent node from spontaneously transmitting data packets to other nodes or from receiving data packets addressed thereto from other nodes but allows the same node to forward (transfer) data packets received from other nodes. "Node Failure (2)" denotes a failure that prevents the pertinent node from not only spontaneously transmitting data packets to other nodes but also forwarding (transferring) data packets received from other nodes. "-" denotes that the pertinent node cannot receive data packet from any nodes. This includes the cases where no data packet reaches the pertinent node and where the pertinent node cannot recognize the reception of the data packet. Referring now to FIG. 5A, particularly to the failure between Nodes A and D, by way of example, a method of locating a failure will be described. Taking a close look at the low of "Failure between Nodes A-D" of the "Failed Part" column from the left end to the right, it is shown that no data packet transmitted in the "normal direction" is received by Node A and that data packets transmitted from Nodes B, C and D in the "reverse direction" are received by Node A. Similarly, it is shown that a data packet transmitted from Node A in the "normal direction" is received by Node B, and that data packets transmitted from Nodes C and D in the "reverse" direction are received by Node B. These showings in FIG. 5 coincide with the above explanations. Accordingly, FIG. 5 represents that failed parts tell which data packets (from which nodes) are received by each node. In other words, each node can locate a failed part based upon a sender node and transmission direction of data packets received by each node in the normal and reverse directions.

<Construction of Data Transmitter-Receiver>

Next, a description will be given of a construction of a data transmitter-receiver according to an exemplified embodiment of the present invention with reference to FIG. 1. A data transmitter-receiver 30 disposed as a node on a ring network includes a normal-direction data transmit/receive unit 19 for transmitting and receiving data transmitted in a normal direction on the ring network, a reverse-direction data transmit/receive unit 20 for transmitting and receiving data transmitted in a reverse direction on the ring network, a buffer control unit 13 for selectively enabling and disabling normal-direction and reverse-direction data transmissions, a controller 14 for exercising control over operation of the data transmitter-receiver 30, and connectors 11, 12 for connecting the normal-direction data transmit/receive unit 19 and the reverse-direction data transmit/receive unit 20 with a transmission line of the ring network. The normal-direction data transmit/receive unit 19 includes a received signal demodulator 7, an input buffer 3, an output buffer 1, an intermediate buffer 2, a sending signal modulator 8, data buses 15, 16, and the like. Similarly, the reverse-direction data transmit/receive unit 20 includes a received signal demodulator 9, an input buffer 4, an output buffer 6, an intermediate buffer 5, a sending signal modulator 10, data buses 17, 18, and the like. The buffer control unit 13 is connected with the data buses 16, 17, input buffers 3, 4, intermediate buffers 2, 5, output buffers 1, 6, and controller 14. The controller 14 is connected with the data buses 15, 16, 17, 18, and buffer control unit 13.

In the normal-direction data transmit/receive unit 19, the received signal demodulator 7 is connected with the connector 12 to demodulate a signal received from the transmission line. The input buffer 3 is connected with the received signal demodulator 7 to enable and disable data input from the transmission line under control of the buffer control unit 13. The output buffer 1 is connected with the sending signal modulator 8 to enable and disable data output to the transmission line under control of the buffer control unit 13. The intermediate buffer 2 is provided between the input buffer 3 and the output buffer 1, for example, to regulate a flow of data from the input buffer 3 to the output buffer 1. The data bus 16 serves to provide connectivity between the input buffer 3 and the intermediate buffer 2, while the data bus 15 serves to provide connectivity between the intermediate buffer 2 and the output buffer 1, so that data is allowed to flow from the input buffer 3 to the intermediate buffer 2, and from the intermediate buffer 2 to the output buffer 1. The sending signal modulator 8 is connected with the connector 11 to modulate data into a signal to be transmitted to the transmission line.

Since the construction of the reverse-direction data transmit/receive unit 20 has a construction similar to the normal-direction data transmit/receive unit 19, a detailed description thereof will be omitted herein.

The physical layer of the ring network may include, but not be limited to, an optical communication, and an electrical connection (single end or differential).

It is understood that data buses are used for connecting the components 1 through 14 with each other, except the buses used for connecting the buffer control unit 13 with the buffers 1-6, for which control buses are used. These control buses provide connectivity between the buffer control unit 13 and each buffer 1-6, and the buffer control unit 13 exerts control over each buffer 1-6 through the control buses, and selectively activates and deactivates each buffer 1-6. Each buffer 1-6 has one-way characteristic. Thus, in the normal-direction data transmit/receive unit 19, the input buffer 3, intermediate buffer 2 and output buffer 1 transmits/receives data only in the normal direction, i.e., from the right to the left as viewed in FIG. 1. In other words, even if data is input to each buffer in the reverse direction, i.e., from the left to the right as viewed in FIG. 1, the data is not output from the buffer. Similarly, in the reverse-direction data transmit/receive unit 20, the input buffer 4, intermediate buffer 5 and output buffer 6 flows data only in the reverse direction. In other words, once data transmitted in the normal direction is received by each buffer, the data is not retransmitted. It is understood that any data signal modulation/demodulation mode may be used in the received signal demodulation units 7, 9 and the sending signal modulation units 8, 10. Hereafter, for the sake of simplicity in explaining data flow in the data transmitter-receiver 30, a description will be omitted of the received signal demodulation unit 7, 9 and the sending signal modulation unit 8, 10.

<Operation of Data Transmitter-Receiver>

A description will be given of an exemplary operation of the data transmitter-receiver as embodied in the above construction for achieving the operation of the network system in ring topology as described above with reference to FIG. 1 again. The controller 14 handles the data buses 15, 16, 17 and 18 as if to handle transmission line segments between nodes, and exerts control over data input and output of each buffer in accordance with communication protocol prescribed individually for each data bus, such as a control area network (CAN) and a time-triggered protocol (TTP). In the construction of the data transmitter-receiver 30, regardless of electrical specifications of the transmission line connected with the connectors 11, 12, the data buses between buffers 1-2, 2-3, 4-5, 5-6 behaves in a manner similar to the outside buses of targets in the conventional bus or ring network, except for electrical delay in the whole transmission line segment between nodes.

Figure 1:
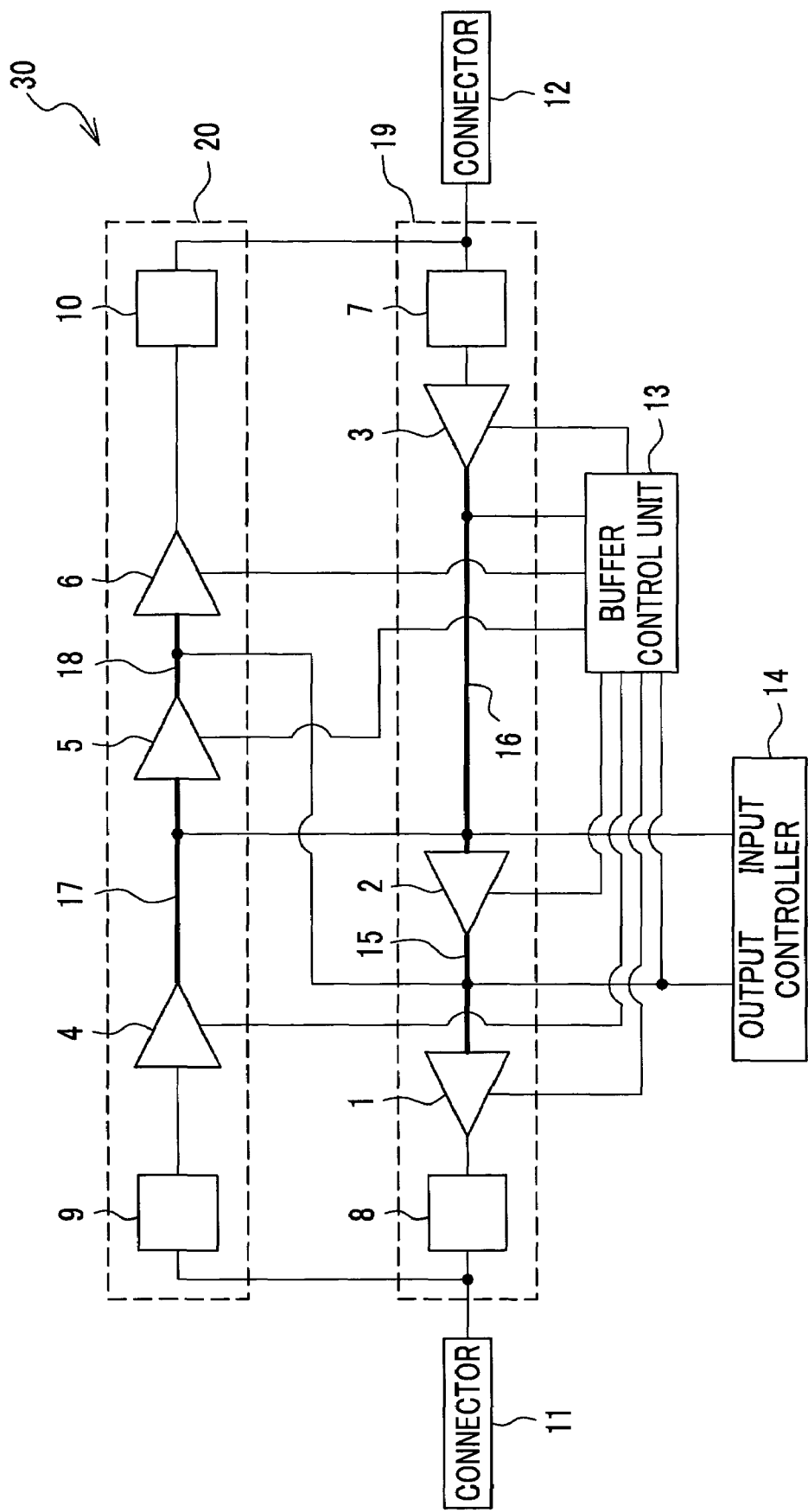
FIG. 1 is a schematic circuit diagram of a data transmitter-receiver according to an exemplified embodiment of the present invention.

Referring first to FIG. 1, a normal operation of data transmission and reception will be described. When the data transmitter-receiver 30 (node) transmits data in the normal direction, the controller 14 instructs the buffer control unit 13 to activate the input buffer 3 and the output buffer 1, and deactivates the other four buffers 2, 4, 5, 6. This allows data output from the controller 14 to transmit through the data bus 15, the output buffer 1, and the connector 11, to other nodes. When the node does not transmit data from itself but receives data flowing in the normal direction, the controller 14 instructs the buffer control unit 13 to activate the input buffer 3, the intermediate buffer 2 and the output buffer 1, and deactivates the other buffers 4-6. Signals input from the connector 12 pass through the input buffer 3 and the data bus 16, and are received by the controller 14 and the buffer control unit 13. When the node transmits data in the reverse direction, the controller 14 instructs the buffer control unit 13 to activate the input buffer 4 and the output buffer 6, and deactivates the other buffers 1, 2, 3, 5. This allows data output from the controller 14 to transmit through the data bus 18, the output buffer 6, and the connector 12, to other nodes. When the node receives data flowing in the reverse direction, the controller 14 instructs the buffer control unit 13 to activate the input buffer 4, the intermediate buffer 5 and the output buffer 6, and deactivates the other buffers 1-3. Signals input from the connector 11 pass through the input buffer 4 and the data bus 17, and reach the controller 14 and the buffer control unit 13. The reason that the intermediate buffer 2 or 5 is deactivated when the node transmits data from itself is to prevent data transmitted in the same direction and received by the input buffer from reaching the output buffer so that data from itself can be transmitted appropriately. In contrast, the intermediate buffer 2 or 5 is activated when the node does not transmit data from itself but waits for data from other nodes, so that data received by the node can pass through the node and is transmitted downstream because data should be received not only by the node itself but also other nodes downstream of the node.

In the normal operation, the node is always waiting for data flowing in the normal or reverse direction, unless the node transmits data from itself as is the case where buffers are regulated as described above. However, when data communication on the ring network is verified, all the nodes transmit packets of data for verification of communication at a series of definite times in the normal and reverse directions alternately. This is the data communication verification mode of the operation of the data transmitter-receiver 30 on the ring network.

Figure 6:
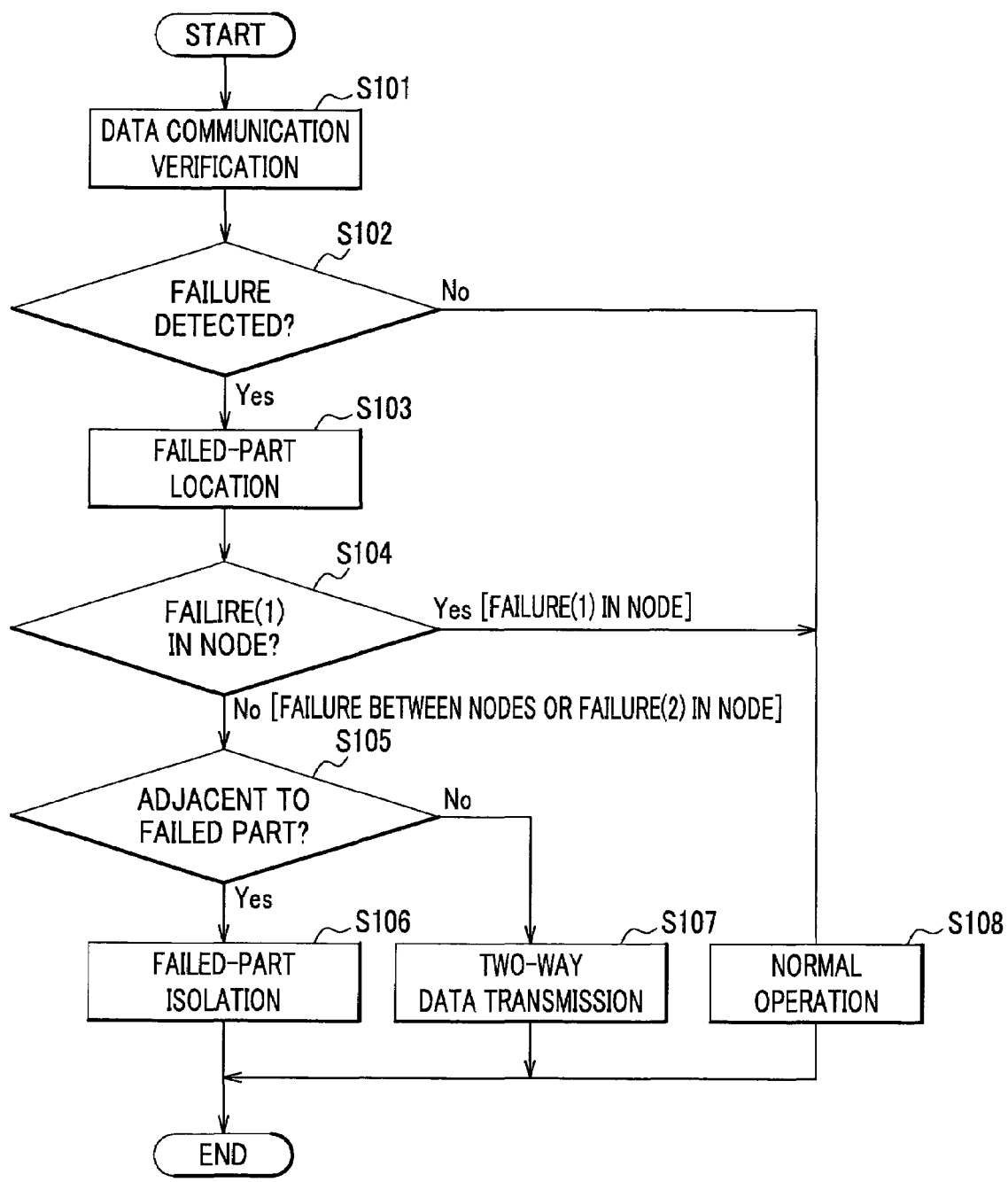
FIG. 6 is a flowchart showing an operation of a data transmitter-receiver according to the present embodiment.

In the following descriptions, a reference will be made as necessary to a flowchart showing the operation of the data transmitter-receiver in FIG. 6. The process steps corresponding to the operation to be explained will be designated by step number enclosed in parentheses. The buffer control unit 13 in each node (data transmitter-receiver 30) determines a direction of transmission and a sender node of the packet of data received in the data communication verification mode (step S101). The buffer control unit 13 in each node determines the presence or absence of a failure on the ring network (step S102) by looking up pertinent information in the table of FIG. 5 based upon the directions of transmission and sender nodes of all the detected packets of data. If it is determined in step S102 that no failure has been detected (No), i.e., each node has received packets of data from all the nodes in the normal and reverse directions, then the process goes back to the normal operation (step S108). If it is determined in step S102 that any failure is detected (Yes), then a failed part is located (step S103). At this stage, the data transmitter-receiver 30 operates in the failed part location mode. The aforementioned process steps embody an exemplary embodiment of the method of locating a failure on a ring network according to the present invention. The method is implemented in the form of a computer program that is executed in the buffer control unit 12 in each node. The program may be stored on a recordable medium such as CD-ROMs. Information on the failed-part location obtained above will be utilized in the subsequent steps that will be described below in detail, and besides may be given to a user through a display means or communication means (not shown).

Figure 2:
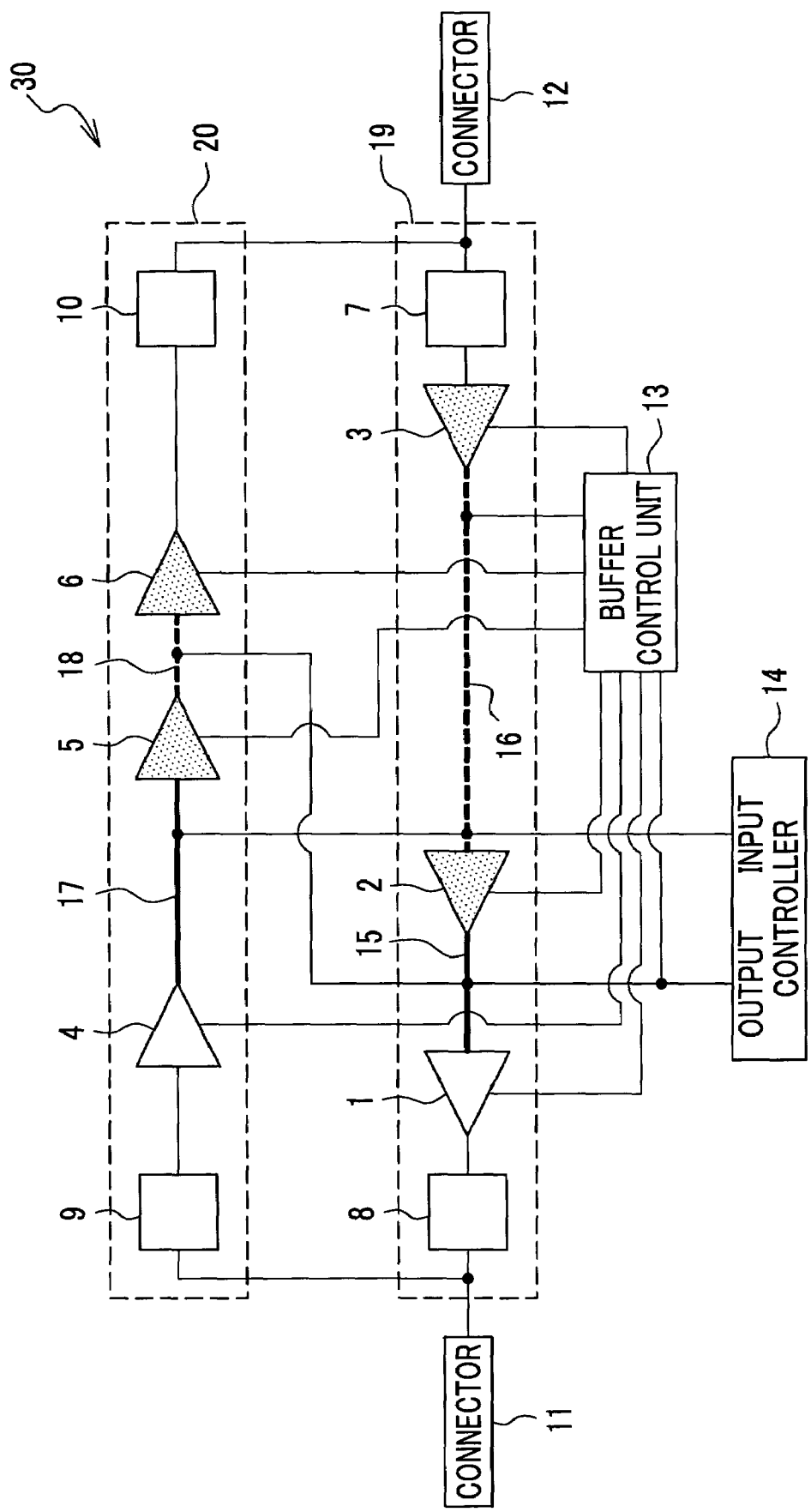
FIG. 2 is a schematic circuit diagram of the data transmitter-receiver of FIG. 1 for explaining a failed-part isolation mode in one node according to the present embodiment.
Figure 3:
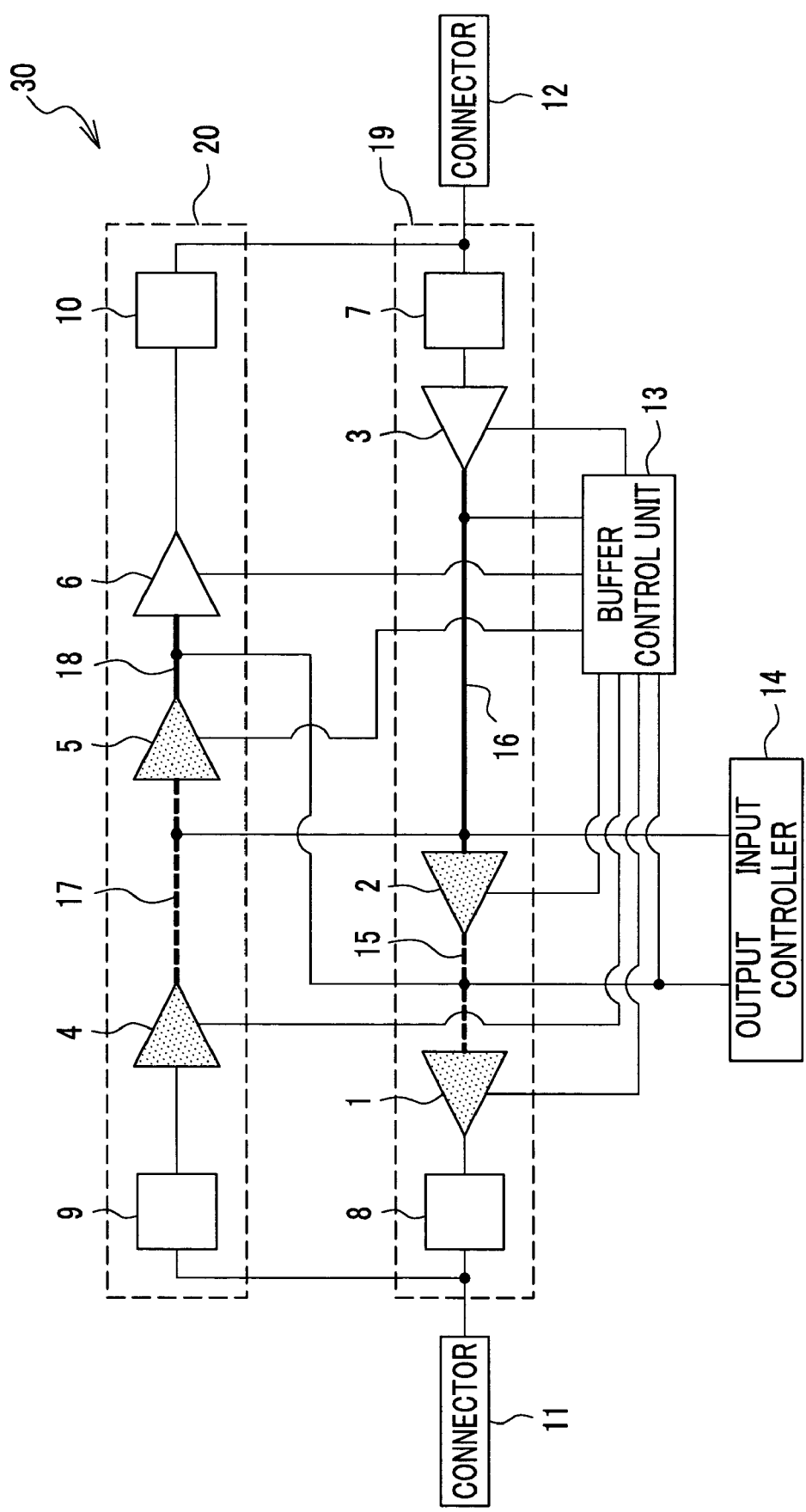
FIG. 3 is a schematic circuit diagram of the data transmitter-receiver of FIG. 1 for explaining a failed-part isolation mode in another node according to the present embodiment.

Next, a description will be given of a process for maintaining communication functionality of the ring network based upon location of the failed part, with reference to the row of "Failure between Nodes D-A" in FIG. 5 (branch 'No' in step S104 of FIG. 6), i.e., a transmission line segment between Node A and Node D becomes faulty. Node A is adjacent to the failed transmission line segment ('Yes' in step S105), and thus is operated to isolate the failed transmission line segment from the ring network (step S106). To be more specific, the buffer control unit 13 of Node A activates the input buffer 4 and the output buffer 1 and deactivates the other buffers (see FIG. 2) in order to isolate the transmission line segment connected with the connector 12 of Node A. As a result, Node A is entirely disabled to transmit and receive any signal through the connector 12, and operates only to carry out data communication to and from the transmission line segment connected with the connector 11. Accordingly, upon data transmission from Node A, a signal from the controller 14 passes through the data bus 15, the output buffer 1 and the connector 11, and is output to the transmission line. Similarly, the buffer control unit 13 of Node D activates the input buffer 3 and the output buffer 6 and deactivates the other buffers (see FIG. 3) in order to isolate the transmission line segment connected with the connector 11 of Node D. As a result, Node D is entirely disabled to transmit and receive any signal through the connector 11, and operates only to carry out data communication to and from the transmission line segment connected with the connector 12. Accordingly, upon data transmission from Node A, a signal from the controller 14 passes through the data bus 15, the output buffer 1 and the connector 11, and is output to the transmission line. At this stage, the data transmitter-receiver 30 operates in the failed-part isolation mode. On the other hand, Node B and Node C are not adjacent to the failed part (No in step S105), and thus is operated to enable two-way data transmission (step S107). More specifically, the buffer control units 13 of Node B and Node C activate all the buffers. This allows signals from the both connectors 11 and 12 to be forwarded (transferred) from a node located upstream thereof to an opposite node located downstream thereof. At this stage, the data transmitter-receiver 30 operates in the two-way transmission mode. Hereupon, when the node in the two-way transmission mode transmits packets of data in the normal and reverse directions, the buffer control unit 13 thereof deactivates the intermediate buffers 2, 5. This is based on the same reason as in the above-described normal operation; i.e., the intermediate buffers 2, 5 are deactivated when the node transmits data from itself in the both directions, to prevent data transmitted on the ring network in the same direction and received by one of the input buffers from reaching the output buffer so that data from itself can be transmitted appropriately.

Turning to the row of "Node A Failure (1)" in FIG. 5 (branch 'Yes' in step S104 of FIG. 6), a description will be given of an operation under a situation where a failure of type (1) occurs in Node A. In this type of failure, Node A can neither transmit data from itself nor receive data addressed to itself from other nodes, but can forward (transfer) data received from one of the adjacent nodes to the other. When this type of failure is encountered, the communication functionality of the ring network can be maintained as if to be normal, and thus neither the isolation of the failed part nor mode shift to the two-way data transmission takes place, but the process returns to the normal operation (step S108). A user may preferably be notified of the failure and the failed part (location) through a display means or communication means (not shown) so that the user may repair or replace the failed part.

Turning to the row of "Node A Failure (2)" in FIG. 5 (branch 'No' in step S104 of FIG. 6), a description will be given of an operation under a situation where a failure of type (2) occurs in Node A. In this type of failure, Node A can neither transmit data from itself nor receive data addressed to itself from other nodes, nor can forward (transfer) data received from one of the adjacent nodes to the other. Therefore, Node B and Node D adjacent to the failed Node A (as determined in step S105 to be 'Yes') goes into the failed-part isolation mode and operates to isolate the transmission line segments for connecting the nodes with Node A from the ring network ("Failed-part Isolation" in step S106). On the other hand, Node C that is not adjacent to failed Node A (as determined in step S105 to be 'No') goes into the two-way transmission mode (step S107). Since a specific control exercised by the buffer control unit 13 and other operations are substantially the same as explained above in relation to the "Failure between Nodes D-A", a duplicate description will be omitted herein.

The process steps as described above exemplify a method of compensating a failure on a ring network according to the present invention. The method is implemented in the form of a computer program that is executed in the buffer control unit 12 in each node. The program may be stored on a recordable medium such as CD-ROMs.

Although the preferred embodiments of the present invention have been described above, various modifications and changes may be made in the present invention without departing from the spirit and scope thereof.

According to the present invention, in a low-cost bilateral ring network system, adequate detection, accurate location, proper compensation of a failure can be achieved so that the communication functionality of the whole system can be maintained. Therefore, a robust and reliable network for a small-scale safety-prioritized system can be provided at low cost.

What is claimed is:

1. A network system comprising:
   a plurality of nodes arranged on a bidirectional ring network, each node comprising:
   a buffer control unit,
   a controller;
   and a data transmitter-receiver having two transmit/receive units, one transmit/receive unit for a normal direction and another transmit/receive unit for a reverse direction, each transmit/receive unit having an intermediate buffer between an input buffer and an output buffer; and
   a nonredundant transmission line formed in a closed loop for connecting every pair of adjacent nodes of the ring network, wherein data is transmittable bidirectionally between the nodes through the transmission line; and
   wherein operation modes of the nodes include a data communication verification mode in which the controller controls the data transmitter-receiver and the buffer control unit to selectively activate and deactivate the buffers of each transmit/receive unit to transmit packets of data at a series of definite times in normal and reverse directions alternately to determine if each node receives every packet of data from the nodes.

2. A network system according to claim 1, wherein the operation modes of the nodes further include a failed-part location mode in which a failed part is located based upon a direction of transmission and a sender node of each packet of data received in the data communication verification mode.

3. A network system according to claim 2, wherein the operation modes of the nodes further include:
   a failed-part isolation mode in which two nodes adjacent to the failed part located in the failed-part location mode isolate the failed part from the ring network; and
   a two-way transmission mode in which every packet of data is transmittable in the normal and reverse directions in nodes other than those adjacent to the failed part.

4. A data transmitter-receiver arranged on a ring network to form a node connected with a nonredundant transmission line formed in a closed loop, the data transmitter-receiver comprising:
   a normal-direction data transmit/receive unit for transmitting and receiving data transmitted in a normal direction on the ring network;
   a reverse-direction data transmit/receive unit for transmitting and receiving data transmitted in a reverse direction on the ring network, wherein each of the normal-direction and reverse-direction data transmit/receive units includes an input buffer for receiving data from the transmission line, an output buffer for outputting data to the transmission line, and an intermediate buffer provided between the input buffer and the output buffer;
   a buffer control unit for selectively activating and deactivating the input buffers, intermediate buffers and output buffers of the normal-direction and reverse-direction data transmit/receive units;
   a controller for exercising control over operation of the data transmitter-receiver; and
   connectors for connecting the normal-direction data transmit/receive unit and the reverse-direction data transmit/receive unit respectively with the transmission line.

5. A data transmitter-receiver according to claim 4, wherein the buffer control unit is configurable to switch a direction of data transmission on the ring network under control of the controller,
   verifying whether each node receives all the packets of data transmitted by the nodes each at the definite times; and locating a failed part on the ring network based upon a direction of transmission and a sender node of each packet of data of which receipt is verified for each receiving node.

6. A data transmitter-receiver according to claim 4, wherein the buffer control unit is configurable to disable data transmission to a specific transmission line segment directly connected with the data transmitter-receiver under control of the controller.

7. A data transmitter-receiver according to claim 6, wherein the data transmission to the specific data transmission line segment is disabled when at least one of the transmission line segment and a node directly connected with the specific data transmission line segment becomes unable to transmit data.

8. A data transmitter-receiver according to claim 4, wherein the buffer control unit is configurable to transmit every packet of data in the normal and reverse directions under control of the controller.

9. A data transmitter-receiver according to claim 8, wherein two-way data transmission is enabled when a failed part is detected on the ring network in a location other than nodes adjacent to the data transmitter-receiver and a transmission line segment directly connecting the data transmitter-receiver with the adjacent nodes.

10. A method of locating a failure on a ring network including a plurality of nodes and a nonredundant transmission line for connecting every pair of adjacent nodes, comprising the steps of:
allowing every node on the ring network to transmit packets of data for verification of communication at a series of definite times in normal and reverse directions alternately; transmitting in a normal direction when a controller of every node activates a first input buffer and a first output buffer in a first transmit/receive unit of every node to transmit data to its respective adjacent node, and the controller of every node activates the first input buffer, a first intermediate buffer, and the first output buffer in the first transmit/receive unit of every node to receive data from its other respective adjacent node;
alternately transmitting in a reverse direction when the controller of every node activates a second input buffer and a second output buffer in a second transmit/receive unit of every node to transmit data to its respective adjacent node, and the controller of every node activates the second input buffer, a second intermediate buffer, and the second output buffer in the second transmit/receive unit of every node to receive data from its other respective adjacent node;
verifying if a buffer control unit within each node determines if the node receives all the packets of data transmitted by all the other nodes in the normal and reverse directions at the definite times; and
locating a failed part on the ring network based upon a direction of transmission and a sender node of each packet of data of which receipt is verified for each receiving node.

11. A method of locating a failure on a ring network according to claim 10, further comprising the step of generating a notice of the failed part located on the ring network to be transmitted to a user.

12. A computer program product comprising a computer usable medium having a computer readable program for locating a failure on a ring network including a plurality of nodes and a nonredundant transmission line for connecting every pair of adjacent nodes, wherein the computer readable program when executed in a buffer control unit in each of the plurality of nodes causes the buffer control unit:
to allow every node on the ring network to transmit packets of data for verification of communication at a series of definite times in normal and reverse directions alternately, transmitting in the normal direction by causing the buffer control unit of each node to activate a first input buffer and a first output buffer in a first transmit/receive unit of each node to transmit data to its respective adjacent node; and to activate the first input buffer, a first intermediate buffer, and the first output buffer in the first transmit/receive unit of every node so as to receive data from its other respective adjacent node;
alternating with transmitting in the reverse direction by causing the buffer control unit of each node to activate a second input buffer and a second output buffer in a second transmit/receive unit of every node to transmit data to its respective adjacent node; and to activate the second input buffer, a second intermediate buffer, and the second output buffer in the second transmit/receive unit of every node so as to receive data from its other respective adjacent node;
to verify if a buffer control unit within each node receives all the packets of data transmitted by all the other nodes in the normal and reverse directions at the definite times; and
to locate a failed part on the ring network based upon a direction of transmission and a sender node of each packet of data of which receipt is verified for each receiving node.

13. A method of compensating for a failure on a ring network including a plurality of nodes and a nonredundant transmission line for connecting a first node adjacent to a second node, comprising the steps of:
allowing the first node and the second node adjacent to a failed part located on the ring network to isolate the failed part from the ring network by a first buffer control unit in the first node activating a first input buffer and a second output buffer in a normal direction and deactivating a first intermediate buffer, a first output buffer, a second input buffer, and a second intermediate buffer in the first node, thereby disabling data communication through a first connector and allowing communication only through a second connector, and
by a second buffer control unit in the second node to activating a third input buffer and a fourth output buffer in a reverse direction and deactivating a third intermediate buffer, a third output buffer, a fourth input buffer, and a fourth intermediate buffer in the second node, thereby disabling communication through a third connector and allowing communication only through a fourth connector; and
allowing nodes other than those adjacent to the failed part to transmit every packet of data in normal and reverse directions.

14. A computer program product comprising a computer usable medium having a computer readable program for compensating for a failure on a ring network including a plurality of nodes and a nonredundant transmission line for connecting every pair of adjacent nodes in a normal direction and a reverse direction, wherein the computer readable program when executed in a buffer control unit of each of the plurality of nodes causes the buffer control unit in each of the two nodes adjacent to a failed part located on the ring network to isolate the failed part from the ring network by:

in the first of the two nodes adjacent to the failed part, activating a first input buffer in a normal direction and a second output buffer in a reverse direction and disabling a first intermediate buffer, a first output buffer, a second input buffer, a second intermediate buffer, and a second connector in the reverse direction and, in the second of the two nodes adjacent to the failed part, activating the second input buffer in the reverse direction and the first output buffer of the normal direction and disabling a first intermediate buffer, a first input buffer, a second output buffer, a second intermediate buffer, and a first connector in the normal direction; and allowing nodes other than those adjacent to the failed part to transmit every packet of data in normal and reverse directions.

* * * * *